(12) United States Patent
Yoshida (10) Patent No.: US 8,695,380 B2
(45) Date of Patent: Apr. 15, 2014

(54) QUARTZ GLASS BURNER

(75) Inventor: Makoto Yoshida, Kamisu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 335 days.

(21) Appl. No.: 13/236,280

(22) Filed: Sep. 19, 2011

(65) Prior Publication Data

US 2012/0073332 A1 Mar. 29, 2012

(30) Foreign Application Priority Data

Sep. 24, 2010 (JP) ................................. 2010-213648

(51) Int. Cl.
*C03B 37/014* (2006.01)
(52) U.S. Cl.
USPC .................... 65/531; 65/413; 65/414; 65/421
(58) Field of Classification Search
CPC ................................................... C03B 37/0142
See application file for complete search history.

(56) References Cited

U.S. PATENT DOCUMENTS

| | | |
|---|---|---|
| 2005/0132749 A1 | 6/2005 | Otsuka et al. |
| 2006/0130531 A1* | 6/2006 | Kang et al. ........................ 65/531 |
| 2009/0068605 A1* | 3/2009 | Yoshida ........................ 431/195 |
| 2009/0214998 A1* | 8/2009 | Yoshida ........................ 431/350 |
| 2010/0218554 A1* | 9/2010 | Yoshida .............................. 65/22 |

FOREIGN PATENT DOCUMENTS

| | | |
|---|---|---|
| JP | 10-28239 A | 1/1989 |
| JP | 1067519 A | 3/1989 |
| JP | 7-021741 | 4/1995 |
| JP | 2002/356332 A | 12/2002 |
| JP | 2003-165737 | 6/2003 |
| JP | 2003-206154 | 7/2003 |
| JP | 2006-306652 A | 11/2006 |
| JP | 2010-195667 A | 9/2010 |

OTHER PUBLICATIONS

European Search Report issued Jan. 21, 2013, in EP Application No. 11 18 2582, filed Sep. 23, 2011.
Office Action dated Dec. 25, 2012 from corresponding Japanese Application No. JP 2010-213648.

* cited by examiner

*Primary Examiner* — Matthew Daniels
*Assistant Examiner* — Lisa Herring
(74) *Attorney, Agent, or Firm* — Workman Nydegger (57) ABSTRACT

The present invention provides a quartz glass burner that can enhance the heating power of flame working without unnecessarily increasing the flow of combustion gas and improve the deposition efficiency on depositing glass particles onto a porous glass preform. The quartz glass burner has a large diameter outer tube, and a plurality of small diameter inner tubes enclosed in the outer tube, and a tip of the outer tube has a port defining member defining the outer shape of a combustion gas ejecting port that ejects combustion gas, and the port defining member protrudes from the inner circumference of the outer tube towards the center axis so as to block the outermost area including areas between the outer circumferences of a plurality of inner tubes forming the inner tube row and the inner circumference of the outer tube of the combustion gas flow path.

9 Claims, 8 Drawing Sheets

QUARTZ GLASS BURNER

CROSS-REFERENCE TO RELATED APPLICATIONS

This application claims the benefit of Japanese Patent Application No. 2010-213648, filed Sep. 24, 2010 which is hereby incorporated by reference herein in its entirety.

BACKGROUND OF THE INVENTION

1. Field of the Invention

The present invention relates to a quartz glass burner.

2. Description of the Related Art

Quartz glass burners are known which have a plurality of small diameter nozzles that are made up of relatively small diameter inner tubes and eject combustion assisting gas such as oxygen gas, and a large diameter nozzle that are made up of relatively large diameter tube enclosing these small diameter nozzles and ejects combustion gas such as hydrogen gas. The quartz glass burner is used for various flame workings by flowing combustion assisting gas through the small diameter nozzles and combustion gas through the large diameter nozzle enclosing the small diameter nozzles to burn them. Also, such quartz glass burner is used for depositing glass particles onto a porous glass preform by flowing glass raw gas through a central tube placed at the center of the burner, combustion assisting gas through small diameter nozzles, and combustion gas through a large diameter nozzle to produce the glass particles by flame hydrolysis reaction.

Conventionally, various researches have been focused on the number and arrangement of nozzles for flowing combustion assisting gas in such type of quartz glass burners in order to improve heating power on flame working or deposition efficiency on depositing glass particles on a porous glass preform. The Japanese Patent Laid-Open No. 2003-206154 defines the arrangement and number of nozzles, and the Japanese Patent Laid-Open No. 2003-165737 defines the diameter and linear velocity thereof. However, for improving the efficiency of flame working and deposition, it is important to consider not only the optimization of combustion assisting gas supplied from nozzles but the adjustment of combustion gas supplied from the large diameter nozzle.

One or more rows of small diameter nozzles are concentrically arranged within an outer tube. Typically, combustion gas ejection from small diameter nozzles in the row at the outermost circumference spreads out into surrounding atmosphere and burns without reacting with combustion assisting gas. Therefore, the wider area into which combustion gas is ejected outside the small diameter nozzles in the row at the outermost circumference gives the lower rate of combustion gas contributing to the heating of objects and the lower heating efficiency.

Furthermore, the increase in the number of small diameter nozzles to enhance heating power leads to the enlargement of a large diameter nozzle enclosing them. Thus, the enlargement of the diameter of combustion gas ejecting ports causes the further enlargement of the outside flow area from small diameter nozzles in the row at the outermost circumference to the outer tube, leading to the decrease in the rate of combustion gas contributing effectively to the heating of the objects. Therefore, the increase in combustion gas must be larger than that in combustion assisting gas so as to enhance heating power.

SUMMARY OF THE INVENTION

The present invention provides a quartz glass burner for enhancing the heating power of flame working without unnecessarily increasing the flow of combustion gas. The invention also provides a quartz glass burner that can improve the deposition efficiency on depositing glass particles on a porous glass preform.

The quartz glass burner according to the present invention includes:

a relatively large diameter outer tube formed of quartz glass;

a plurality of relatively small diameter inner tubes formed of quartz glass enclosed in the outer tube, each of the plurality of inner tubes defining a flow path of combustion assisting gas and having a tip opening defining a ejecting port ejecting combustion assisting gas, the plurality of inner tubes are arranged along a circumference of a circle with a center at a center axis of the outer tube so as to form an inner tube row, outer circumferences of the plurality of inner tubes defining a combustion gas flow path of combustion gas together with an inner circumference of the outer tube together; and a port defining member disposed at a tip of the outer tube and defining an outer shape of a combustion gas ejecting port ejecting combustion gas, the port defining member protruding from the inner circumference side of the outer tube towards the center axis side so as to block the outermost area of the combustion gas flow path including areas between the outer circumferences of the plurality of inner tubes forming the inner tube row and the inner circumference of the outer tube.

According to the present invention, the blocking of the outermost area of the combustion gas flow path by a port defining member can narrow the cross sectional area of the path and limit the volume of combustion gas not contributing to combustion and enhance the heating power of flame working. Additionally, according to the present invention, the enhancement of the heating power of flame working can improve the deposition efficiency of glass particles upon forming a porous glass preform.

Further features of the present invention will become apparent from the following description of exemplary embodiments (with reference to the attached drawings).

DESCRIPTION OF THE EMBODIMENTS

Various embodiments of the invention will now be described with reference to attached drawings. It is noted that the present invention is not limited to the embodiments.

First Embodiment

Figure 1:
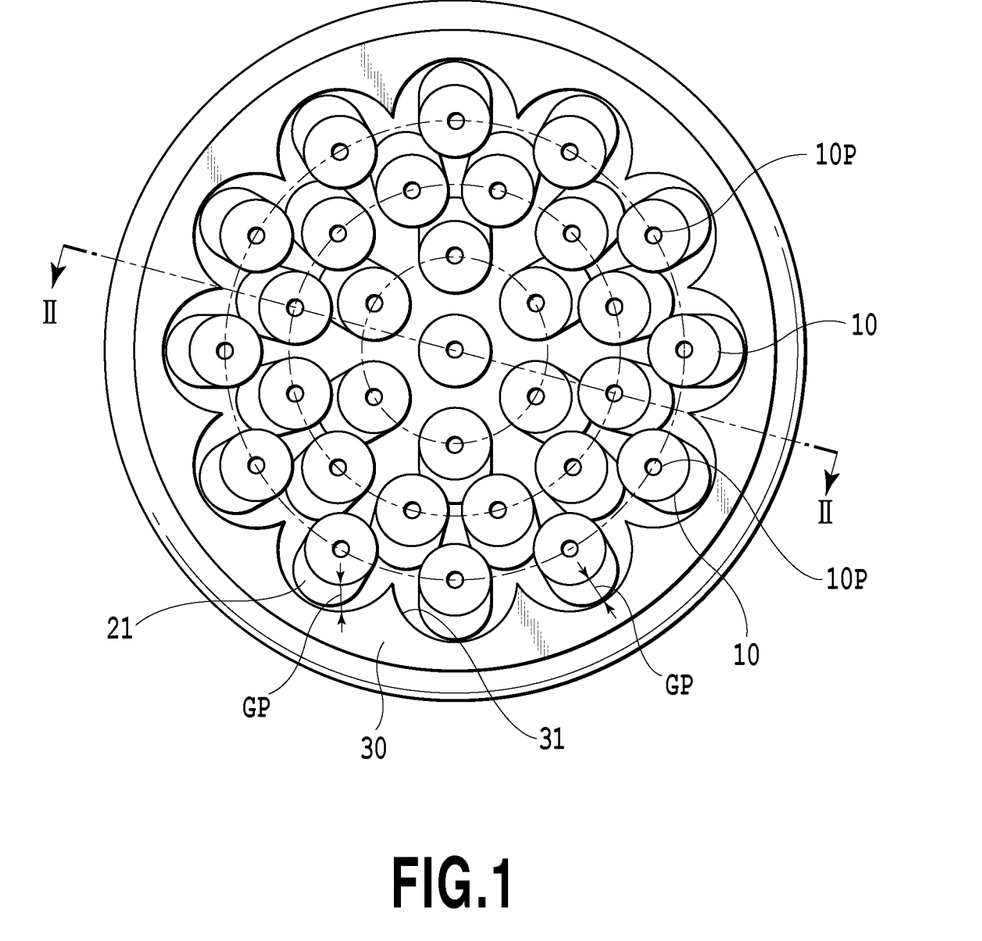
FIG. 1 shows a front schematic view of a quartz glass burner according to an embodiment of the invention.
Figure 2:
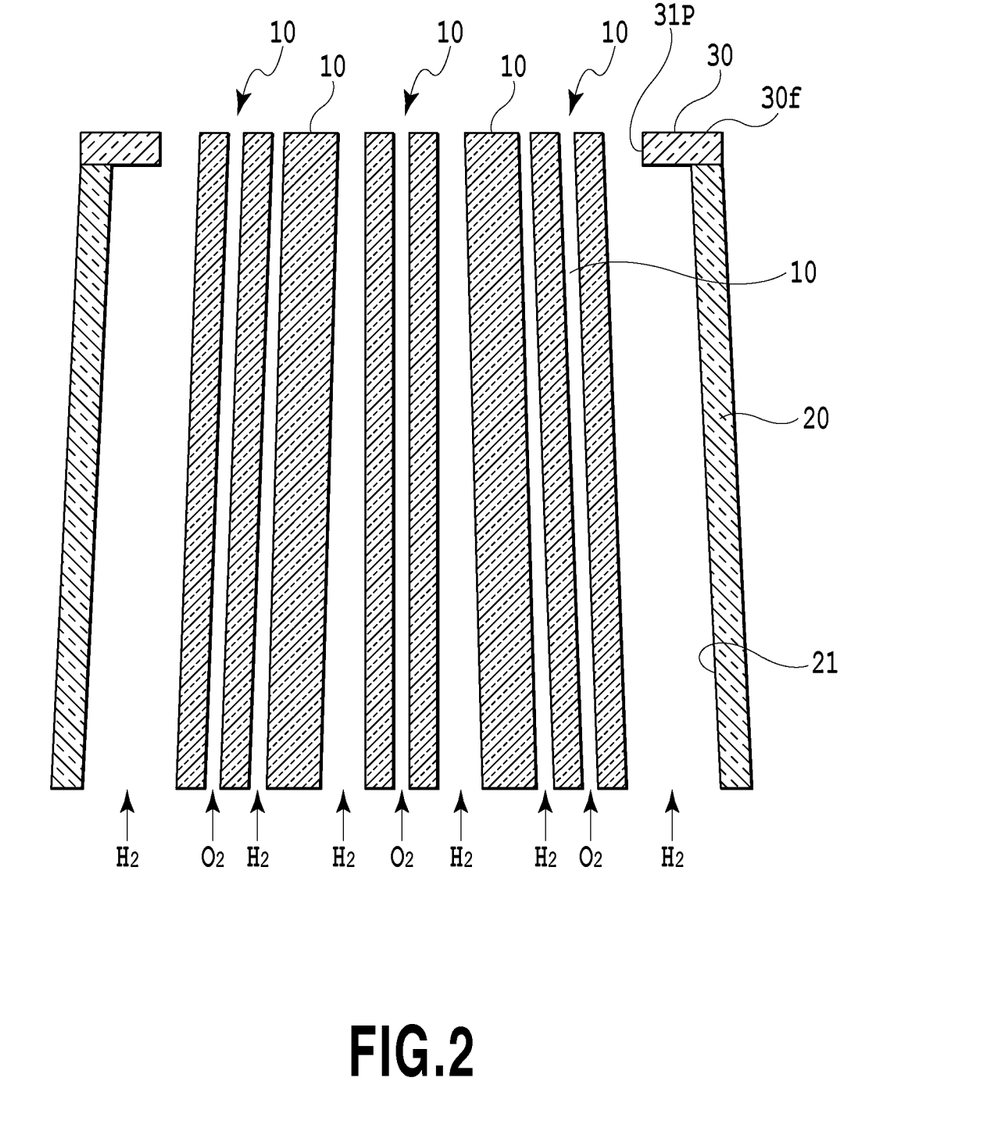
FIG. 2 shows an end view of the burner of FIG. 1 in the II-II direction of the burner.

FIG. 1 is a front schematic view of a quartz glass burner for processing a quartz glass according to an embodiment of the invention, and FIG. 2 shows an end view of FIG. 1 in the II-II direction.

A quartz glass burner according to the embodiment is used for the flame working of synthesized quartz glasses. The quartz glass burner has a plurality of inner tubes 10 made of quartz glass with relatively small diameters, an outer tube 10 made of quartz glass with a large diameter enclosing the plurality (31 in total) of inner tubes 10, and a port defining member 30 attached to a tip of the outer tube 20.

Each of the plurality of inner tubes 10 defines a flow path through which combustion assisting gas such as oxygen gas flows and combustion assisting gas ejecting port having a tip opening for ejecting the combustion assisting gas. Also, one of the plurality of inner tubes 10 is arranged at the center of the outer tube 20, while the others are arranged along the circumferences of three concentric circles each having different radius whose center is the central axis of the outer tube 20, constituting three inner tube rows.

The inner circumference 21 of the outer tube 20 and the outer circumference of the inner tube 10 together defines combustion gas flow path through which combustion gas such as hydrogen gas flows, for example. That is, combustion gas introduced from the rear end of the outer tube 20 flows in a space formed between the inner circumference 21 of the outer tube 20 and the outer circumferences of the plurality of the inner tube 10.

The port defining member 30 is made up of a circular quartz glass plate, fastened at the tip of the outer tube 20 and defines the outer shape of combustion gas ejecting port 31P that ejects combustion gas such as hydrogen gas. A front edge surface 30f of port defining member 30 is arranged on the same plane as each tip of the plurality of the inner tubes 10. Note that combustion gas ejecting port 31P is defined by the inner circumference of port defining member 30 and the outer circumference of the plurality of inner tubes 10. The port defining member 30 protrudes from the inner circumference 21 of the outer tube 10 towards the center axis side so as to block the outermost area including the outer circumferences of the plurality of inner tubes 10 forming the outermost inner tube row and the inner circumference 21 of the outer tube 10. Additionally, the port defining member 30 has a plurality of notched portions 31 for forming a gap Gp among each of the plurality of the inner tubes 10 forming the outermost inner tube row. The notched portions 31 are formed as an arc such that the gap Gp is in an approximately constant shape in a circumference direction of the inner tubes 10. Furthermore, the gaps Gp between the inner tubes 10 and the corresponding notched portions 31 have the same size. Note that the gap Gp may be formed such that it changes in the circumference direction of the inner tube 10. Also, the gaps Gp of the notched portions 31 may differ from each other. Furthermore, although the shape of notched portion 31 is an arc in the embodiment, the notched portion 31 may take some other shapes.

According to the embodiment, the cross section of the outermost area of the combustion gas flow path can be narrowed by blocking the outermost area of the combustion gas flow path with port defining member 30 thereby controlling the increase in combustion gas not contributing to burning that is likely to occur in the outermost area. As a result, the heating power of flame working can be enhanced without unnecessarily increasing the flow of combustion gas.

Examples of the quartz glass burner illustrated in FIGS. 1 and 2 will now be described.

The size of the gap Gp was 0.5 mm. A quartz glass tube with the outer diameter of 4.0 mm and inner diameter of 0.9 mm was used for the small diameter nozzle 10. A quartz glass dummy rod with the diameter of 60 mmϕ was heated with a combustion gas discharge of 250 L/min and combustion assisting gas discharge of 100 L/min and the maximum temperature of the rod was recorded.

Figure 3:
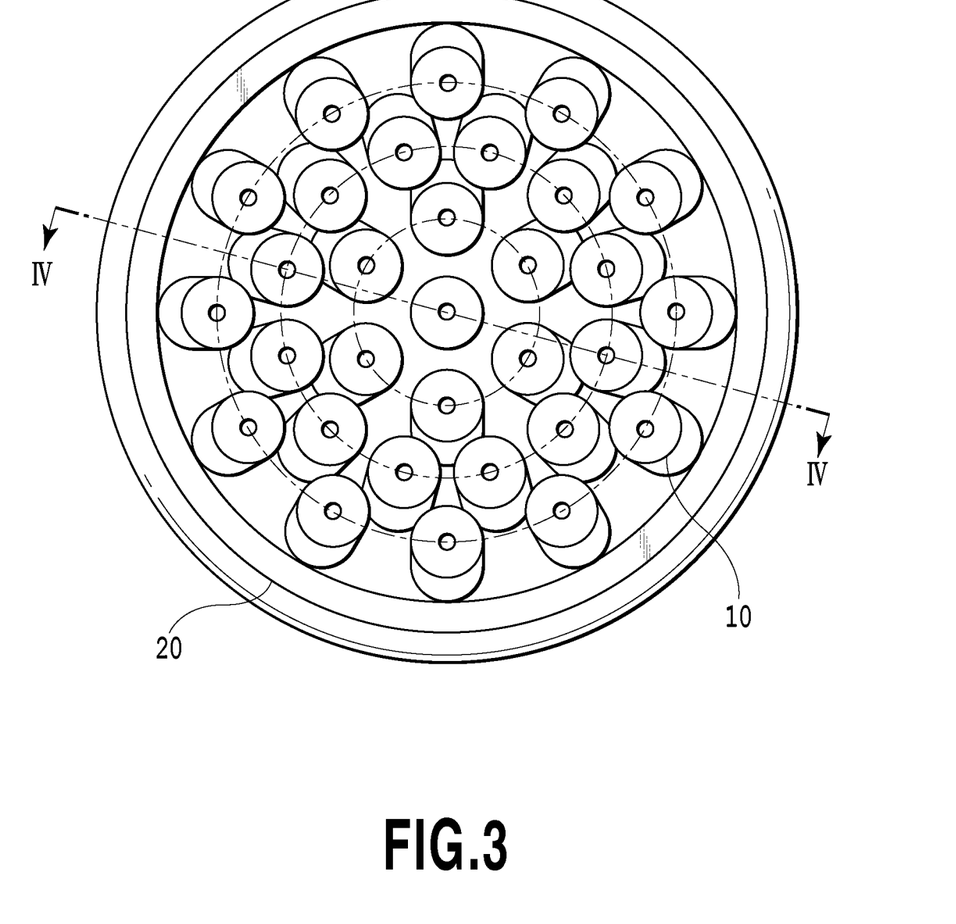
FIG. 3 shows a front schematic view of a quartz glass burner without a port defining member.
Figure 4:
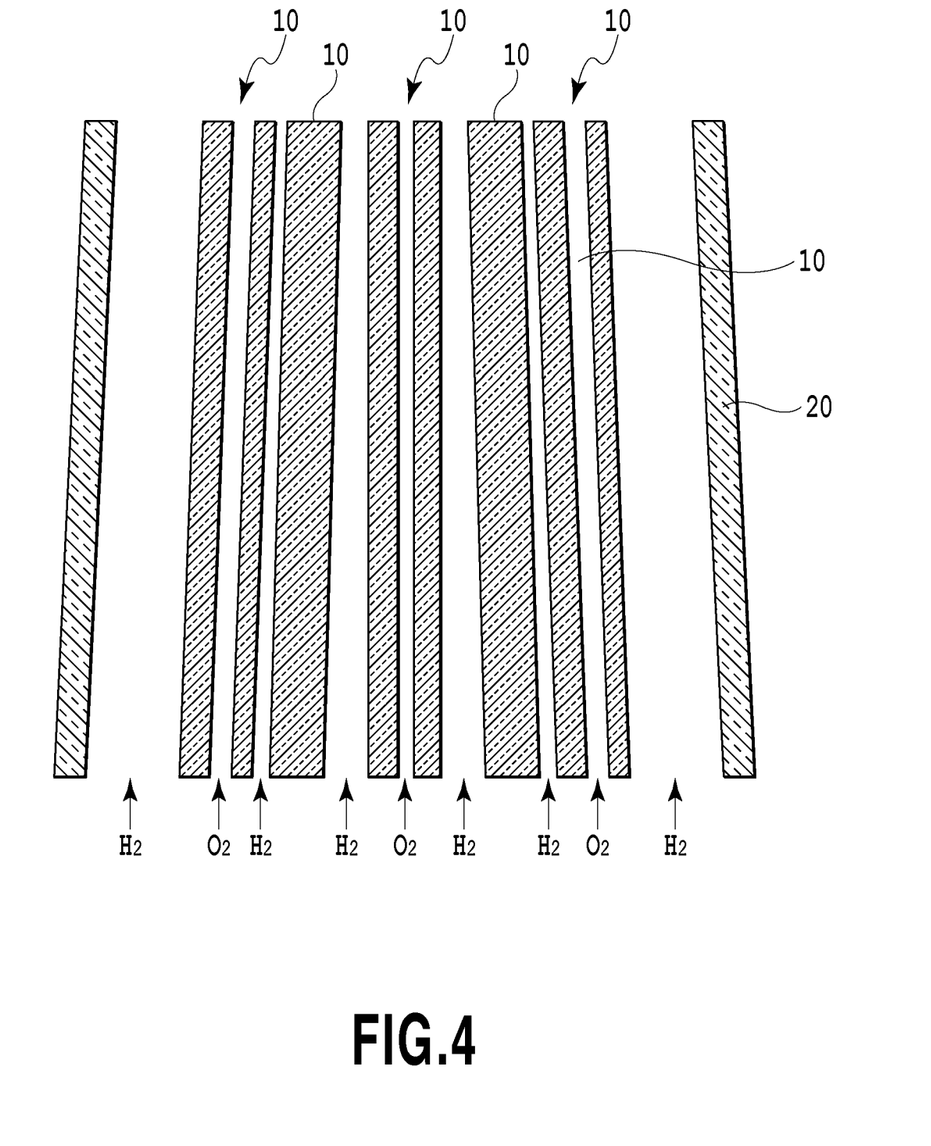
FIG. 4 shows an end view of the burner of FIG. 3 in the IV-IV direction of the burner.

In addition, the glass dammy rod was heated at the same condition with the burners illustrated in FIGS. 3 and 4 and the maximum temperature of the rod was recorded. The quartz glass burners illustrated in FIGS. 3 and 4 are those in FIGS. 1 and 2 with port defining member 30 being removed, respectively.

Example 1

Table 1 shows the measurement result in which the maximum temperature of the burner of the example went up to 2170 degree Celsius, 70 degree Celsius higher than that of a conventional burner. This is because the port defining member 30 acted such that combustion gas was concentrically supplied to the center side of the burner, contributing effectively to the heating of a dummy rod.

TABLE 1

| | | | Comparable Example | Example 1 | Example 2 |
|---|---|---|---|---|---|
| Small diameter O2 nozzle | Inner diameter | mm | 0.9 | 0.9 | 0.9 |
| | Outer diameter | mm | 4.0 | 4.0 | 4.0 |
| | discharge | L/min | 100 | 100 | 100 |
| | number of tubes | | 31 | 31 | 31 |
| H2 ejecting nozzle | Inner diameter (maximum diameter) | mm | 30.4 | 30.4 | 30.4 |
| | discharge | L/min | 250 | 250 | 210 |
| | linear velocity | m/s | 12.4 | 17.7 | 14.9 |
| maximum temperature | | Celsius | 2060 | 2130 | 2060 |

Example 2

Gas flow supplied to the burner of the embodiment was adjusted such that its maximum temperature has the same value, 2060 degree Celsius, as the burners with no part defining portion 30 illustrated in FIGS. 3 and 4, resulting in 14% reduction in combustion gas.

Second Embodiment

Figure 5:
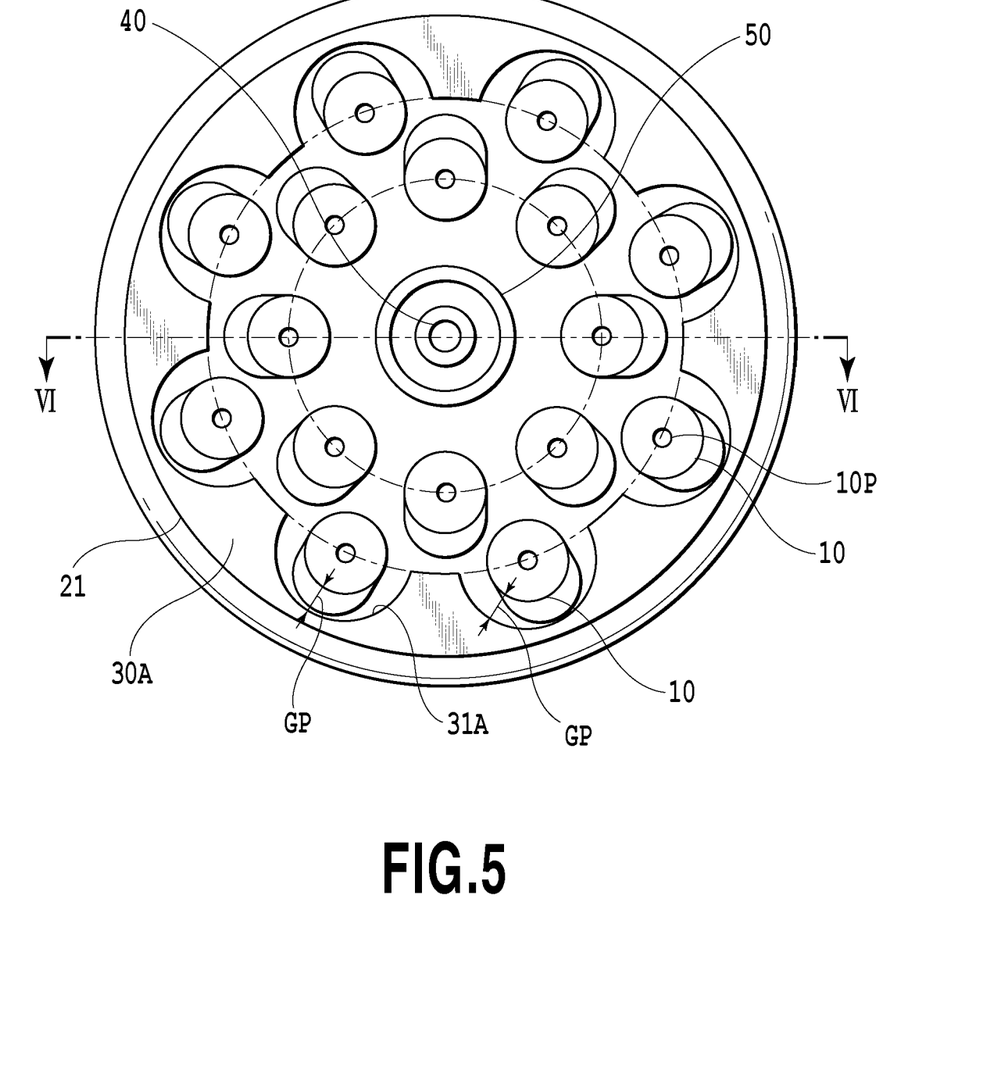
FIG. 5 shows a front schematic view of a quartz glass burner according to another embodiment of the invention.
Figure 6:
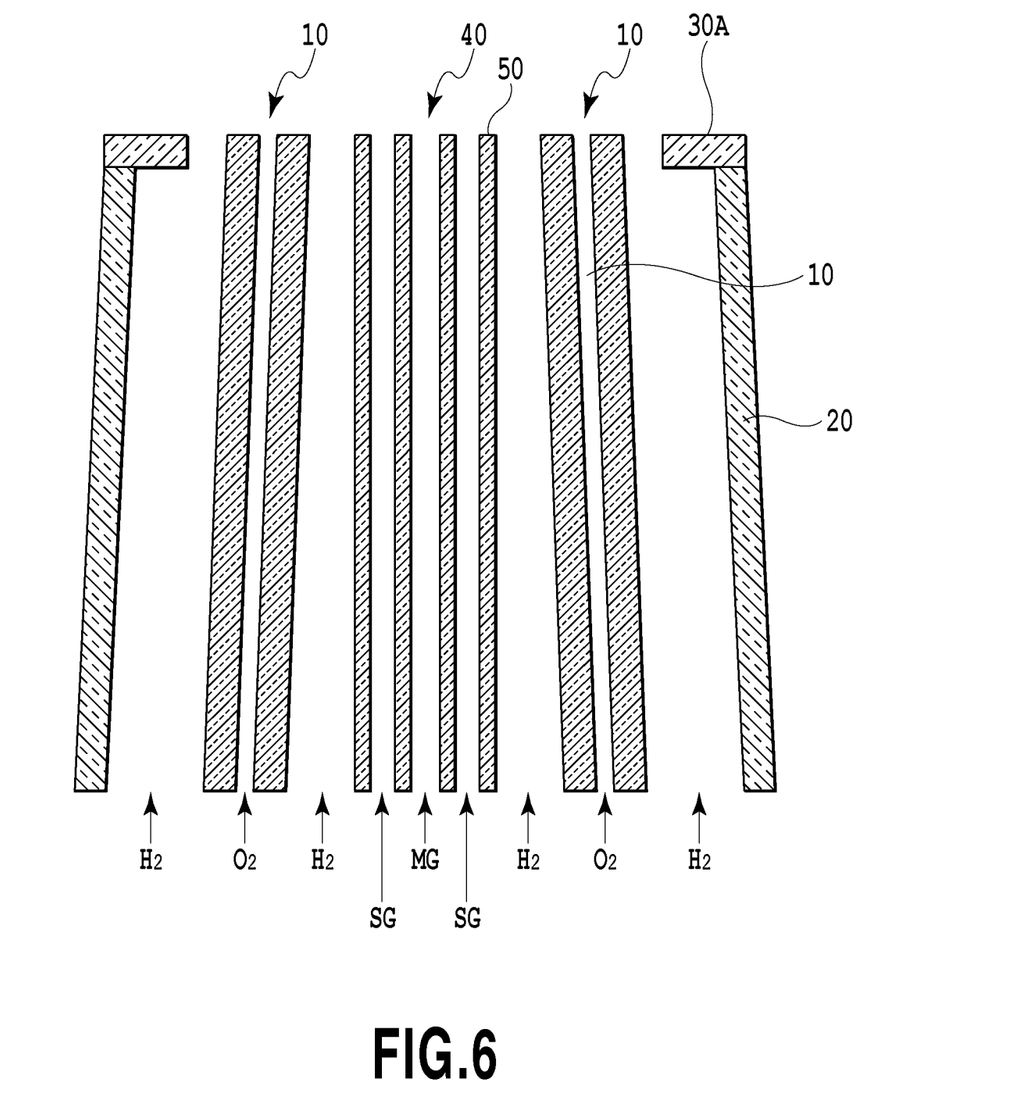
FIG. 6 shows an end view of the burner of FIG. 5 in the VI-VI direction of the burner.

FIG. 5 shows a front schematic view of a quartz glass burner according to other embodiments of the invention, and FIG. 6 shows an end view of the burner of FIG. 5 in the II-II direction of the burner. In FIGS. 5 and 6, similar numbers are used for similar elements in FIGS. 1 and 2. The quartz glass burner according to the embodiment is used for manufacturing porous glass preforms.

The quartz glass burner includes a raw material gas tube 40 at the center of an outer tube 20, which defines a flow path through which glass material gas MG flows and a ejecting port that ejects the glass material gas MG from its tip opening, and a seal gas tube 50 arranged concentrically outside of the tube 40. A flow path through which seal gas SG flows is defined between the tube 40 and 50. A seal gas ejecting port that ejects the seal gas SG is defined by the tips of the tubes 40 and 50.

A plurality (16 in total) of inner tubes 10 are arranged along the circumferences of two concentric circles each having different radius whose center is the central axis of the outer tube 20, constituting two inner tube rows. Additionally, the port defining member 30A is made up of a circular quartz glass plate and has a plurality of notched portions 31A for forming a gap Gp among each of the plurality of the inner tubes 10 forming the outermost inner tube row. The notched portions 31A are formed as an arc, as in the first embodiment.

Figure 7:
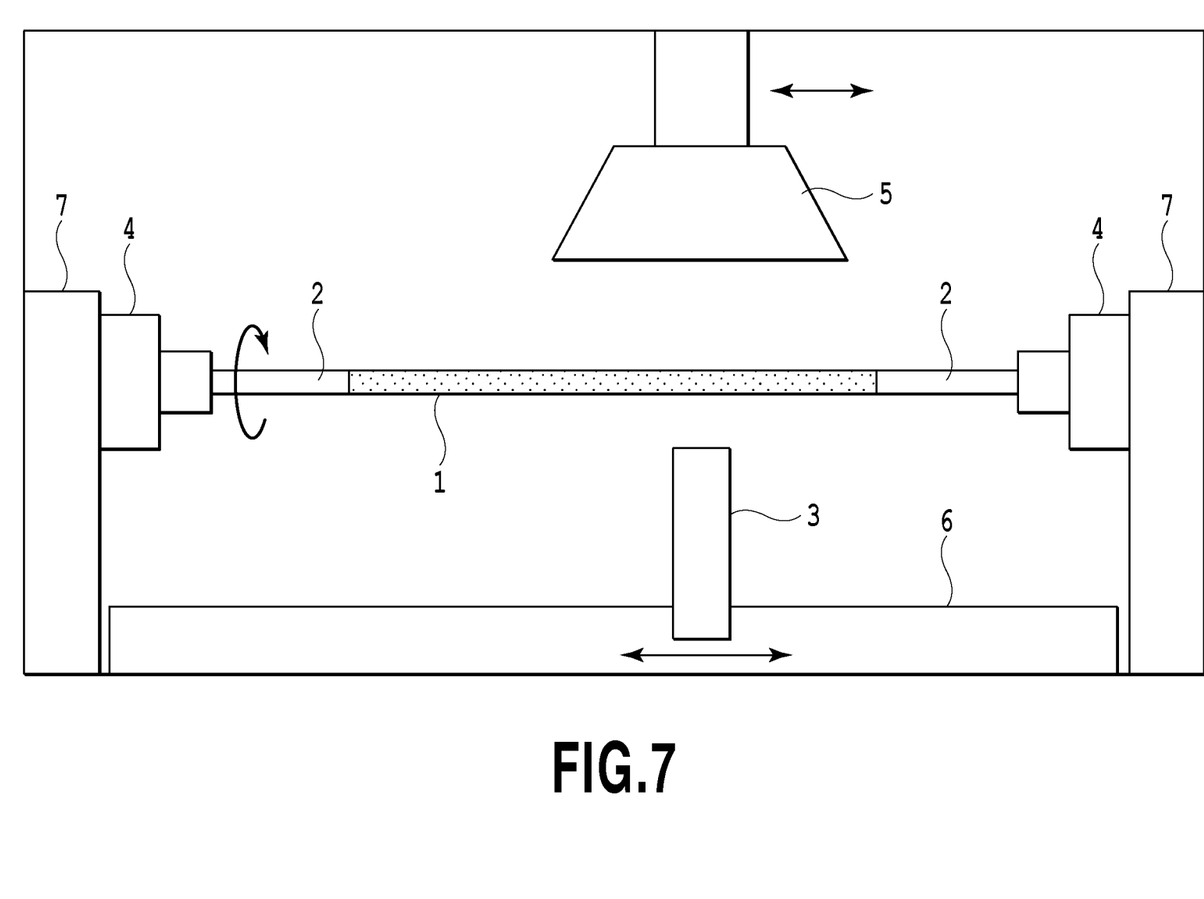
FIG. 7 shows an example of an apparatus for manufacturing an optical fiber preforms.

The quartz glass burner is used for, for example, an apparatus for manufacturing a porous glass preform illustrated in FIG. 7. In the apparatus, dummy rods 2 are welded at the both ends of a quartz glass made dummy rod 1 and supported by chuck and rotating mechanisms 4. Each of the mechanisms 4 is mounted on a support member 7 and rotates the rod 1 around its axis. The above quartz glass burner is used for a burner 3, which moves back and forth in the longer direction of the rod 1 with a moving mechanism 6 and deposits synthesized glass particles onto the rotating rod 1, thereby forming a porous glass preform around the rod 1. Note that an exhaust hood 5 exhausts gas produced in a chamber outside.

Example 3

An example of the quartz glass burner illustrated in FIGS. 5 and 6 will be now described.

The size of the gap Gp was 0.5 mm. A quartz glass tube with the outer diameter of 3.0 mm and inner diameter of 1.5 mm was used for the small diameter nozzle 10. Glass material gas MG and combustion assisting gas are supplied to the tube 40 with the discharge of 15 L/min, seal gas SG is supplied to the flow path between the tube 40 and 50 with discharge of 4 L/min, combustion assisting gas is supplied to the nozzle 10 with the discharge of 25 L/min, and combustion gas is supplied to the tube 20 enclosing the above components with the discharge of 250 L/min, thereby depositing glass particles onto a quartz glass made dummy rod with the diameter of 50 mmφ and length of 1000 mm until the they reach 50 kg.

Figure 8:
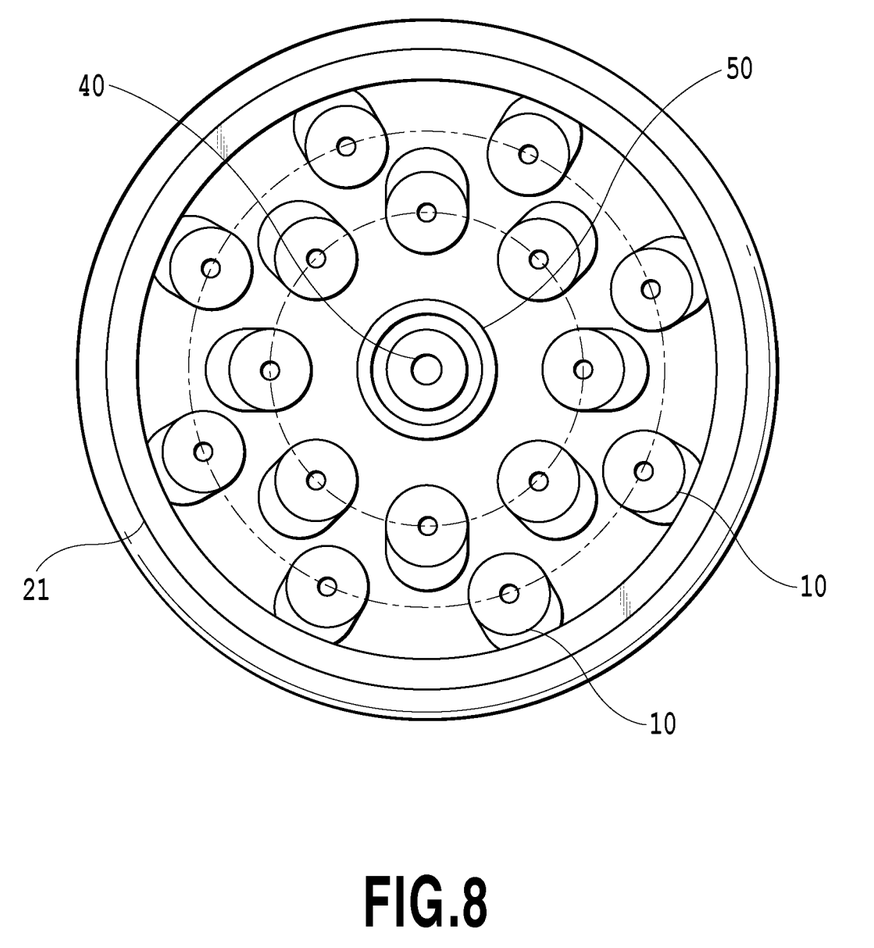
FIG. 8 shows a front schematic view of a quartz glass burner without a port defining member.

In addition, glass particles are deposited onto the glass dammy rod at the same condition with the burners illustrated in FIG. 8. The burner illustrated in FIG. 8 is that in FIGS. 5 and 6 with port defining member 30A being removed.

Table 2 shows the deposition result in which the deposition efficiency went up to 69%, 4% higher than that of the burner of FIG. 8.

This is because the port defining member 30A acted such that combustion gas was concentrically supplied to the center side of the burner, contributing effectively to the heating of a dummy rod, the large linear velocity, and the control of the diffusion and turbulence of flame.

TABLE 2

| | | | Comparable Example | Example 3 | Example 4 |
|---|---|---|---|---|---|
| Small diameter O2 nozzle | Inner diameter | mm | 1.5 | 1.5 | 1.5 |
| | Outer diameter | mm | 3.0 | 3.0 | 3.0 |
| | discharge | L/min | 25 | 25 | 25 |
| | number of tubes | | 16 | 16 | 16 |

TABLE 2-continued

| | | | Comparable Example | Example 3 | Example 4 |
|---|---|---|---|---|---|
| H2 ejecting nozzle | Inner diameter (maximum diameter) | mm | 30.0 | 30.0 | 30.0 |
| | discharge | L/min | 250 | 250 | 210 |
| | linear velocity | m/s | 6.7 | 9.6 | 8.1 |
| deposition efficiency | | % | 65 | 69 | 65 |

Example 4

Gas flow supplied to the burner of the embodiment was adjusted such that its deposition efficiency has the same value as the conventional burner illustrated in FIG. 8, resulting in 16% reduction in the consumption of combustion gas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A quartz glass burner, comprising:
   a relatively large diameter outer tube formed of quartz glass;
   a plurality of relatively small diameter inner tubes formed of quartz glass enclosed in the outer tube, each of the plurality of inner tubes defining a flow path of combustion assisting gas and having a tip opening defining an ejecting port ejecting combustion assisting gas, the plurality of inner tubes being arranged along a circumference of a circle with a center at a center axis of the outer tube so as to form an inner tube row, outer circumferences of the plurality of inner tubes defining a combustion gas flow path of combustion gas together with an inner circumference of the outer tube together; and
   a port defining member disposed at a tip of the outer tube and defining an outer shape of a combustion gas ejecting port ejecting combustion gas, the port defining member protruding from the inner circumference side of the outer tube towards the center axis side so as to block the outermost area of the combustion gas flow path including areas between the outer circumferences of the plurality of inner tubes forming the inner tube row and the inner circumference of the outer tube,
   wherein the port defining member has a plurality of notched portions for forming gaps between a plurality of the inner tubes forming the inner tube row, respectively.

2. The burner of claim 1, wherein each of the plurality of notched portions has an arc shape.

3. The burner of claim 2, wherein a gap formed between the inner tube and the corresponding arc shaped notched portion has an approximately constant shape in a circumference direction of the inner tube.

4. The burner of claim 2, wherein the gaps between the inner tubes and the corresponding arc shaped notched portions have the substantially same size.

5. The burner of claim 1, wherein a front edge surface of the port defining member is arranged on the same plane as each tip of the plurality of inner tubes.

6. The burner of claim 1, wherein the port defining member is formed by annular plates.

7. The burner of claim 1, wherein the port defining member is made of quartz glass.

8. The burner of claim 1, further comprising another inner tube row formed of a plurality of inner tubes inside the inner tube row.

9. The burner of claim 1, further comprising a raw material gas tube disposed at a center region of the outer tube, defining a flow path of glass raw material gas and having a tip opening defining an ejecting port ejecting the raw material gas.

* * * * *